United States Patent [19]

Schierjott

[11] Patent Number: 4,668,905
[45] Date of Patent: May 26, 1987

[54] CURRENT MONITOR FOR SWITCHING REGULATORS

[75] Inventor: Rudolf Schierjott, Munich, Fed. Rep. of Germany

[73] Assignee: Siemens Aktiengesellschaft, Berlin and Munich, Fed. Rep. of Germany

[21] Appl. No.: 817,863

[22] Filed: Jan. 13, 1986

[30] Foreign Application Priority Data

Jan. 28, 1985 [DE] Fed. Rep. of Germany ....... 3502781

[51] Int. Cl.$^4$ .............................................. G05F 1/46
[52] U.S. Cl. ..................... 323/287; 363/97; 363/56
[58] Field of Search .................... 363/56, 97; 323/276, 323/277, 278, 285, 287

[56] References Cited

U.S. PATENT DOCUMENTS

| | | | |
|---|---|---|---|
| 3,260,921 | 7/1966 | Brahm | 363/41 |
| 3,590,364 | 6/1971 | Okun | 323/9 |
| 3,733,537 | 5/1973 | Kernick et al. | 363/56 |
| 4,002,963 | 1/1977 | Hunter | 363/56 |
| 4,019,096 | 4/1977 | Bullinga | 323/277 |
| 4,278,930 | 7/1981 | Rogers | 323/285 |
| 4,541,039 | 9/1985 | Sandler | 363/97 |

FOREIGN PATENT DOCUMENTS 3206266  9/1983  Fed. Rep. of Germany ......... 7/127

OTHER PUBLICATIONS

Schaltnetzteile, by Joachim Wustehube (Hrsg.), pp. 178, 179, and 454–457, published by Expert Verlag in 1979.
Halbleiter-Schaltungstechnik by U. Tietz, Ch. Schenk; pp. 390–395 Springer-Verlag, Berlin, Heidelberg, New York, 1980.

Primary Examiner—Peter S. Wong
Assistant Examiner—Judson H. Jones
Attorney, Agent, or Firm—Hill, Van Santen, Steadman & Simpson

[57] ABSTRACT

A circuit arragement for monitoring current in a switching converter, wherein an inductance is charged pulse-wise with a current via a power switch. In accordance with the invention, the mean value of the voltage drop across the inductance is formed via an RC-component and the power switch is blocked via a threshold value switch when a predetermined maximum voltage drop is exceeded across the inductance.

6 Claims, 4 Drawing Figures

CURRENT MONITOR FOR SWITCHING REGULATORS

BACKGROUND OF THE INVENTION

The invention relates to a circuit arrangement for monitoring current in a switching converter having an inductance charged in pulse-wise fashion with a current via a power switch.

In switching current supplies, switch-mode converters, and similar circuit arrangements, high currents are periodically connected to inductances via power switches. Here the problem occurs that on the occurrence of an excess current, the current in the power switch, i.e. in the semiconductor switching element, must be limited in order to prevent the destruction of these switching elements. The excess current can be produced by overload, a short-circuit, or by the run-up of switching regulators under a capacitive load.

Fuses and magnetic excess current circuit breakers are generally too slow to protect the semiconductor, i.e. the power switch, in the event of a rapid increase in current. Furthermore, these elements break the circuit in an irreversible manner. For this reason, it is known to connect measuring impedances, i.e. so-called shunts or current transformers, into the circuits which are to be protected, and by means of an appropriate electronics analyis unit, to disconnect the power switch on the occurrence of an excess current therein. These techniques are described in the book "Schaltnetzteile" by J. Wustehube, Chapter 5.41 and 5.42 and 12.10.3. These techniques not only result in great expense, but also result in an undesired voltage drop in the load circuit. Furthermore, special embodiments must be selected for the measuring impedances on account of their low-ohmic characteristics.

SUMMARY OF THE INVENTION

An object of the invention is to provide a circuit arrangement for current monitoring which is of simple construction.

This object is fulfilled in accordance with the invention by providing a means for forming a substantially averaged value of a voltage drop across the inductance. A threshold value switch means connects to the means for forming a value and blocks the power switch when a predetermined maximum of the voltage drop across the inductance is exceeded.

An advantage of the current-monitoring circuit arrangement in accordance with the invention is that no expensive measuring impedances are required.

A further advantage is that the current-monitoring circuit arrangement in accordance with the invention can be used universally, i.e., for example, for primary and secondary side clock-controlled switching regulators.

Another substantial advantage is that at high temperatures of the inductance windings, the current is limited at an earlier point because of the positive temperature coefficient of the winding wire.

When an operational amplifier having an open collector is used as a threshold value switch, the output thereof can be directly connected to the output of a pulse-width modulator, provided the latter is likewise provided with an output transistor having an open collector.

DESCRIPTION OF THE PREFERRED EMBODIMENTS

Figure 1:
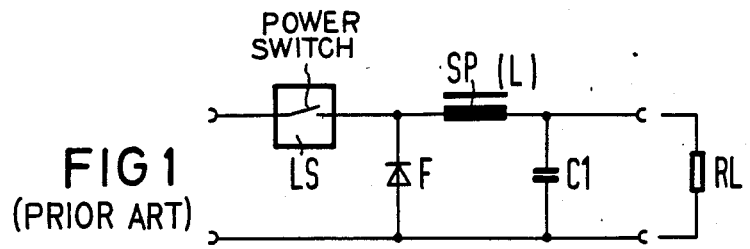
FIG. 1 represents a known downward adjusting device.
Figure 2:
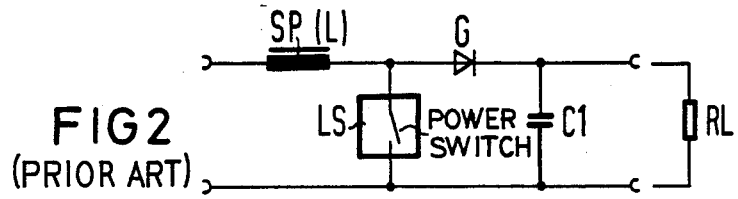
FIG. 2 represents a known upwardly adjusting device.
Figure 3:
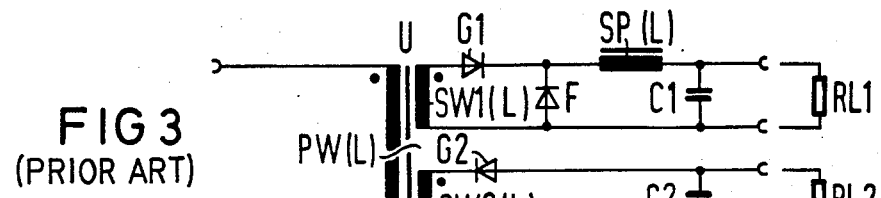
FIG. 3 represents a known primary switching regulator.

FIGS. 1 through 3 represent known switching regulators in which identical references have been used for similarly functioning components.

FIG. 1 represents a downwardly adjusting device with which a coil SP is periodically charged with current via a power switch LS. During the conductive phase of the power switch LS, the current flows across the power switch LS, across the coil SP, and on across a connected load resistor RL. For the smoothing of the current, the coil SP is connected at its output to a smoothing capacitor C1. During the blocked phase of the power switch LS, the current is maintained via a free-running diode F.

FIG. 2 represents an upwardly adjusting device with which a coil SP is periodically charged with current via a power switch LS. During the conductive phase of the power switch LS the current flows into the coil SP. During the blocked phase of the power switch LS, the energy stored in the coil SP is output, as current, via a rectifier diode G to the load resistor RL. Here again, for the smoothing of the current, the smoothing capacitor C1 is connected to the output of the rectifier diode G.

FIG. 3 represents a converter supplied by clock pulses on the primary side with a transformer U. A primary winding PW of the transformer U forms the input circuit together with the power switch LS. On the secondary side, two output circuits have been shown, the upper of which, together with the input circuit, represents a flow-through converter, and the lower of which represents a blocking converter.

In the case of the flow-through converter, during the conductive phase of the power switch LS, energy is transferred from the primary winding PW to the first secondary winding SW1 of the transformer U. As a result, a current is emitted to a first load resistor RL1 via a first rectifier diode G1 and the following coil SP. For smoothing purposes, a smoothing capacitor C1 is arranged at the output end. During the blocked phase of the power switch LS, this current flow is maintained via the free-running diode F.

In the case of the blocking converter, again during the conductive phase of the power switch LS, energy is transferred from the primary winding PW to the core of the transformer U. During the blocked phase of the power switch LS, this energy is emitted via a second secondary winding SW2 and a second rectifier diode G2 to a second load resistor RL2. Here again a smoothing capacitor C2 is arranged at the output end for smoothing purposes.

The secondary switching regulators illustrated in FIGS. 1 and 2 are described with respect to their construction and operating mode in the book "Halbleiter-schaltungstechnik" by Tietze and Schenk, Fifth Edition, Chapter 16.5.1, which is known prior art. The primary switching regulator illustrated in FIG. 3 is described with respect to its two possible embodiments as a flow through converter and blocking converter in the book "Schaltnetzteile" by Joachim Wustehube, 1979, Chapters 2 and 3.

The invention is based on the following principle.

In the current-monitoring circuit arrangement in accordance with the invention, the existing switched inductance, i.e. the coil SP (see FIGS. 1 and 2) or the primary winding PW, or one of the secondary windings SW1, SW2 of the transformer U (see FIG. 3), is used for current measurement. By the mean value of the voltage connected to the inductance formed via a low-pass filter, such as an RC-component, the ohmic voltage drop is determined. This voltage drop is used to disconnect the power switch LS via a threshold value switch which is formed, for example, of a comparator or operational amplifier. This voltage drop represents a measure of the ohmic voltage drop across the winding resistor of the inductance and thus represents a measure of the active current.

Here the positive temperature coefficient of the winding wire of the switched inductance exerts a favorable influence. At high winding temperatures, caused for example by high environmental temperatures or high loads of long duration, the current is limited at an earlier point and thus an excessive temperature load is counteracted.

Figure 4:
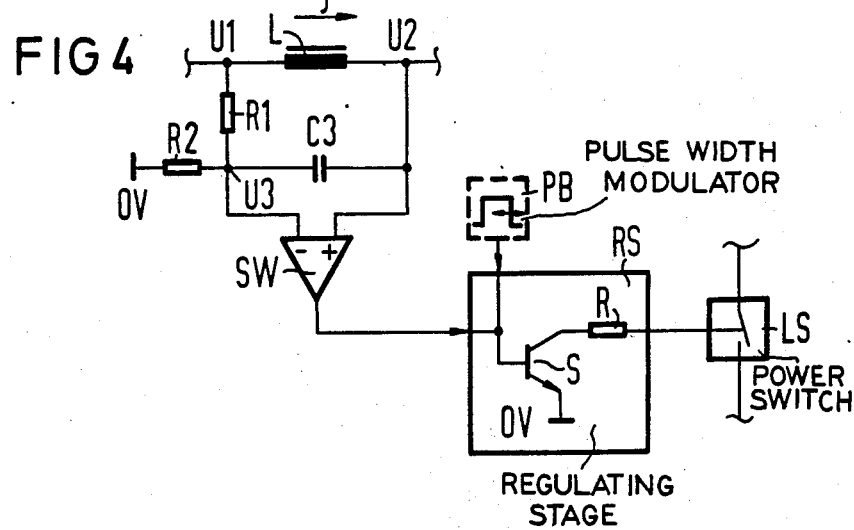
FIG. 4 illustrates the current-monitoring circuit arrangement in accordance with the invention.

FIG. 4 represents the current monitoring arrangement in accordance with the invention for switch-mode regulators. A current I flows through an inductance L from which a first voltage value U1 can be tapped at the input end and a second voltage value U2 can be tapped at the output end. This inductance L can be formed of one of the coils SP shown in FIGS. 1 to 3, or one of the windings PW, SW1, SW2 shown in FIG. 3. Thus the current I is produced directly in the case of the coils SP and the primary winding PW, and is produced indirectly via the transformer U in the secondary windings SW1, SW2 by the switching processes of the power switch LS. The inductance L is connected in parallel with the series arrangement of an RC-component formed of a resistor R1 and a capacitor C3 in this sequence. The product of the ohmic value of the resistor R1 and the capacitive value of the capacitor C3 of the RC-component is approximately ten times greater than the period duration of the switching frequency of the switching regulator.

An unreferenced point between the resistor R1 and the capacitor C3, at which a third voltage value U3 can be tapped, is connected to a reference potential 0 via a resistor R2. Also provided is a threshold value switch SW at whose inverting input the third voltage value U3 occurs, and at whose non-inverting input the second voltage value U2 occurs. Thus the capacitor C3 of the RC-component is connected between the inputs of the threshold value switch SW which consists, for example, of an operational amplifier. The output of the threshold value switch SW is connected to a regulating stage RS at which, for example, the output signal of a pulse-width modulator PB likewise occurs.

The regulating stage RS serves to drive the power switch LS. The regulating stage RS comprises, for example, a control transistor S and a resistor R, so that the base of the power switch LS can be connected to the reference potential 0 when the power switch is formed of a bipolar semiconductor switching element.

The mode of operation of the current-monitoring circuit arrangement in accordance with the invention will be described in the following.

A pulse-like current I flows through the inductance L. Via the RC-component, formed of the resistor R1 and the capacitor C3, an image of the ohmic voltage drop across the inductance L is formed by mean value formation. This ohmic voltage drop, which is tapped from the capacitor C3 and is connected to the inputs of the threshold value switch SW, causes the output signal of the threshold value switch SW to change when a limit value is exceeded.

Here the threshold value can be adjusted by an ohmic voltage divider formed of the resistors R1 and R2. The third voltage value U3 which is connected to the inverting input of the threshold value switch SW represents this threshold value. When the second voltage value U2, which can be tapped from the output end of the inductance L and is connected to the non-inverting input of the threshold value switch SW, falls below the threshold value, i.e. the third voltage value U3, the threshold value switch SW changes its binary output value from a level corresponding to logic 1 to a level corresponding to logic 0. Thus, the fall of the second voltage value U2 is in proportion to the increase of the current I flowing into the inductance L. The first voltage value U1, and thus also the third voltage value U3 derived from this value, are largely independent of the value of this current I.

When the threshold value switch emits a level corresponding to logic 1, via the regulating stage RS the power switch LS becomes or remains conductive. When the threshold value switch SW emits a level corresponding to logic 0, the power switch LS is blocked via the regulating stage RS.

When an appropriate operational amplifier is used as threshold value switch SW, it is also possible to operate the power switch LS directly, i.e. without a regulating stage RS.

In order to maintain a constant output voltage, the regulating stage RS is driven, for example, by a pulse-width modulator PB. The switching network between the output voltage of the switching converter and the pulse-width modulator PB is of subordinate importance in terms of the invention, and has not been shown. In the circuit arrangement represented in FIG. 4, the pulse-width modulator PB and the threshold value switch SW each contain an output transistor having an open collector. In this way, it is possible to electrically couple the outputs of these two switching stages in a simple manner. The power switch LS is blocked via the regulating stage RS whenever the pulsewidth modulator PB (in order to maintain a constant output voltage) or the threshold value switch SW (when a maximum value through the inductance L is exceeded) emit from their respective outputs a level corresponding to logic 0.

Although various minor changes and modifications might be proposed by those skilled in the art, it will be understood that I wish to include within the claims of the patent warranted hereon all such changes and modifications as reasonably come within my contribution to the art.

I claim as my invention:

1. A circuit arrangement for current-monitoring in a switching converter, comprising:
    an inductance connected in series with a load and conveying output current thereto, and means for charging the inductance in pulse-wise fashion with a power switch;

averaging means for forming a substantially averaged value of a voltage drop across the inductance comprising an RC-component connected in parallel with the inductance; and a threshold value switch means comprising an operational amplifier connected to the averaging means for blocking the power switch when a predetermined maximum of the voltage drop across the inductance is exceeded, said operational amplifier having two inputs, between said two inputs a capacitor of the RC-component being connected, a resistor together with a resistor of the RC-component being connected to form a voltage divider, an output of the voltage divider being connected to one of said operational amplifier inputs so as to provide a reference voltage thereto, the voltage divider being connected between an input end of the inductance and a reference potential, and an output transistor with an open collector being connected between an output of the operational amplifier and the power switch.

2. A circuit arrangement according to claim 1 wherein the inductance is a coil in a downwardly adjusting circuit of a switching inverter.

3. A circuit arrangement for current-monitoring in a switching converter having an inductance connected in series with a load to supply output current thereto, and means for charging the inductance in pulse-wise fashion with a current via a power switch, comprising:

voltage value formation and threshold determining means for forming a time averaged voltage value representative of a voltage drop across the inductance and for opening the power switch when a predetermined maximum of the voltage value across the inductance is exceeded as a result of an undesirable overload current pulse capable of destroying the power switch; and said voltage value formation and threshold determining means comprising a first resistor having one end connected to a current input end of the inductance and a second end connected through a capacitor to a current output end of the inductance, an operational amplifier having first and second inputs connecting to opposite sides of said capacitor, a second resistor connecting between the junction of said first resistor and capacitor and a reference potential, and a transistor whose base is connected to an output of the operational amplifier, whose emitter is connected to the reference potential, and whose collector is an open collector which connects to the power switch.

4. A circuit arrangement according to claim 3 wherein the first resistor and capacitor form a low-pass filter.

5. A circuit arrangement according to claim 3 wherein a pulse width modulator connects to a base of the transistor at which the output of the operational amplifier connects.

6. A circuit arrangement for current-monitoring in a switching converter having an inductance connected in series with a load to supply output current thereto, and means for charging the inductance in pulse-wise fashion with a current via a power switch, comprising:

voltage value formation and threshold determining means for forming a time averaged voltage value representative of a voltage drop across the inductance and for opening the power switch when a predetermined maximum of the voltage value across the inductance is exceeded as a result of an undesirable overload current pulse capable of destroying the power switch; and said voltage value formation means including a first resistor having one end connected to a current input end of the inductance, an operational amplifier connecting to the other end of the first resistor, a second resistor connecting between the other end of the first resistor and a reference potential, and a transistor whose base is connected to an output of the operational amplifier, whose emitter is connected to the reference potential, and whose collector is an open collector which connects to the power switch.

* * * * *